(12) United States Patent
Hsieh

(10) Patent No.: US 6,450,462 B1
(45) Date of Patent: Sep. 17, 2002

(54) RETAINING DEVICE FOR A TELESCOPIC MUSIC STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 09/988,131

(22) Filed: Nov. 19, 2001

(51) Int. Cl.⁷ .............................................. F16M 11/00
(52) U.S. Cl. ...................... 248/125.1; 248/161
(58) Field of Search ........................ 248/230.4, 125.1, 248/125.2, 125.3, 125.8, 132, 414, 416, 157, 218.4, 230.1, 161; 84/421

(56) References Cited

U.S. PATENT DOCUMENTS 5,988,573 A  * 11/1999  Mueller ................ 248/161 X

* cited by examiner

Primary Examiner—Ramon O. Ramirez
(74) Attorney, Agent, or Firm—Jones, Tullar & Cooper, P.C.

(57) ABSTRACT

A retaining device for a telescopic music stand has a housing adapted to be secured to the outer tube and having a passage with a step so as to receive the inner tube and outer tube respectively in the passage. A holding arm is pivotally connected to an inner face of the housing and has an inner face configured to mate with an outer periphery of the inner tube. A spring is abutted between the inner face of the housing and the holding arm to force the holding arm toward the passage so that the inner face of the holding arm is able to abut the outer face of the inner tube to hold the inner tube in place relative to the outer tube.

6 Claims, 4 Drawing Sheets

RETAINING DEVICE FOR A TELESCOPIC MUSIC STAND

BACKGROUND OF THE INVENTION

1. Field of the Invention

The present invention relates to a retaining device, and more particularly to a retaining device for a telescopic music stand. The retaining device is pivotal with respect to the music stand so that the telescopic music stand is able to be selectively secured or released.

2. Description of Related Art

A conventional telescopic music stand includes an outer tube, an inner tube slidably received in the outer tube and a retaining screw. The retaining screw extends through the outer periphery of the outer tube to abut the outer periphery of the inner tube so that the position of the inner tube relative to the outer tube is secured. When the position of the inner tube is about to be adjusted, for example, to be retracted inside the outer tube or extend further to the outer tube, the user rotates the retaining screw to release the abutment to the outer periphery of the inner tube so that the inner tube is able to slide freely inside the outer tube. When the position of the inner tube relative to the outer tube is adjusted, then the user once again rotates the retaining screw to abut the outer periphery of the inner tube to secure the inner tube with respect to the outer tube. This kind of adjusting mechanism does have the effect to adjust the relative position between the inner tube and the outer tube. However, some factors still need to be considered especially when the adjusting mechanism is put in practice.

Normally, the free end of the inner tube is loaded with something, e.g. a drum, a cymbal, etc. so that when the relative position between the inner tube and the outer tube is adjusted, whether the retaining screw can hold the load on the inner tube is still a question. Furthermore, after a period of using the retaining screw, inevitably, there will be scratches on the outer periphery of the inner tube, which deteriorate the overall appearance of the inner tube. Because the operation of the retaining screw depends solely on the threads through the periphery of the outer tube and on the retaining screw, if either threads is damaged there will be no retaining effect to hold the inner tube in place any more.

To overcome the shortcomings, the present invention tends to provide an improved retaining device to mitigate and obviate the aforementioned problems.

SUMMARY OF THE INVENTION

The primary objective of the invention is to provide a retaining device to effectively secure the inner tube with respect to the outer tube. The retaining device has a holding arm pivotally connected to the housing of the retaining device so that the pivotal movement of the holding arm is able to selectively hold the inner tube relative to the outer tube.

Another objective of the present invention is to provide an abutting element extendable inside the housing of the retaining device so that the abutting element is able to selectively abut the holding arm to push the holding arm away from the inner tube to release the limitation to the inner tube from the holding arm.

Still another objective of the present invention is to provide an adjusting screw extending through the outer periphery of the outer tube to engage with the abutting element so as to control the movement of the abutting element.

Other objects, advantages and novel features of the invention will become more apparent from the following detailed description when taken in conjunction with the accompanying drawings.

DETAILED DESCRIPTION OF THE PREFERRED EMBODIMENT

Figure 1:
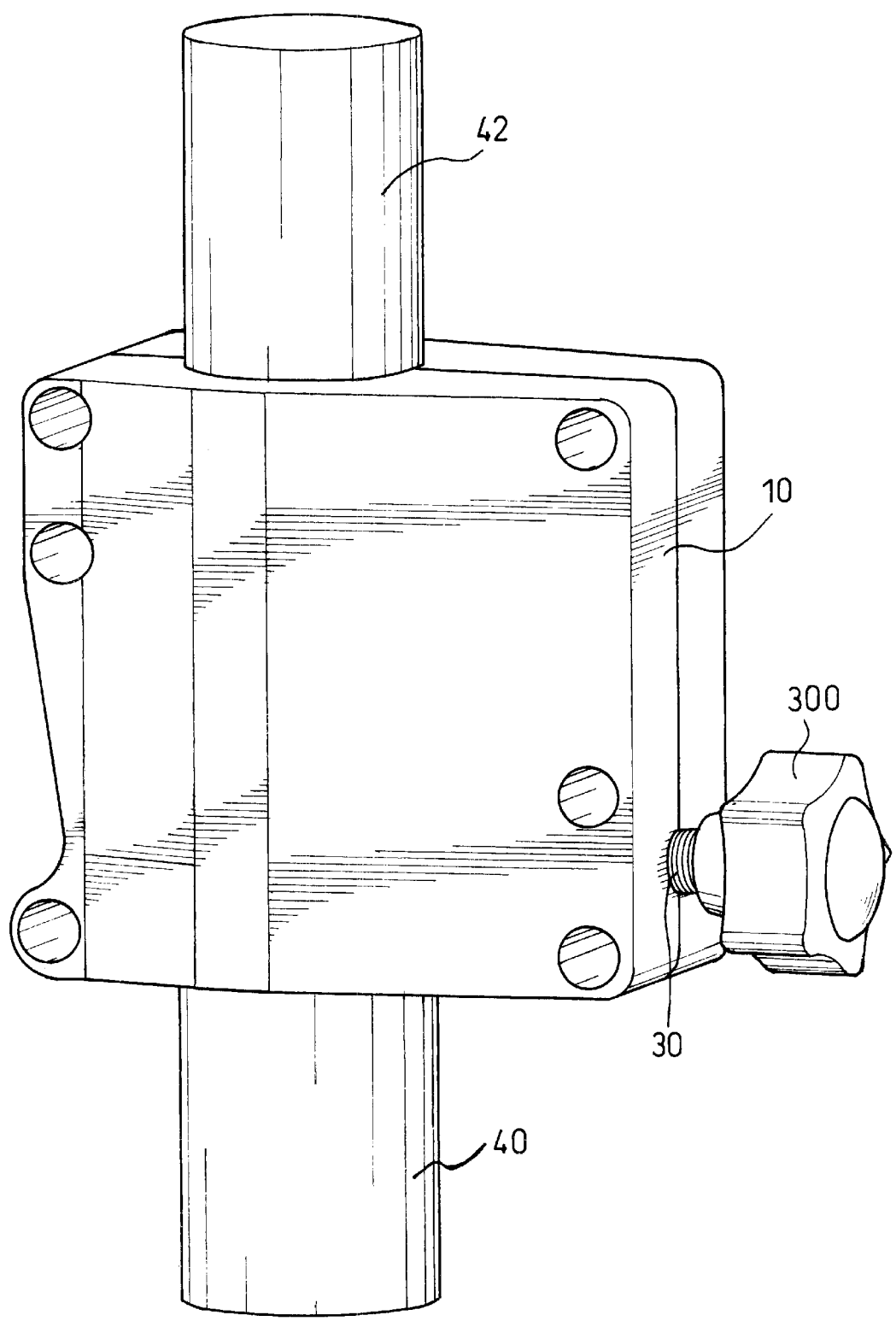
FIG. 1 is a perspective view of the retaining device of the present invention combination with an outer tube and an inner tube.
Figure 2:
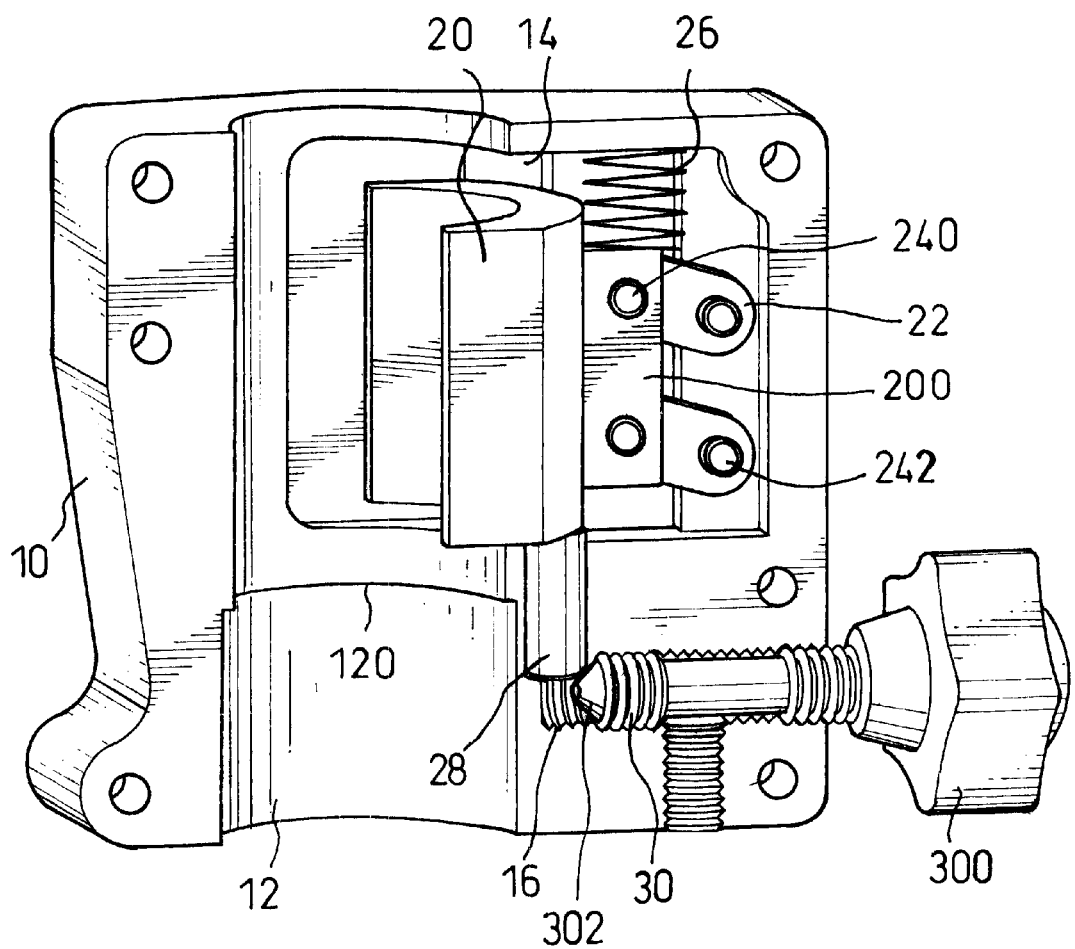
FIG. 2 is a perspective view showing the inner structure of the retaining device of the present invention with the first half of the housing removed.

With reference to FIGS. 1 and 2, the retaining device in accordance of the present invention is used in combination of an outer tube (40) and an inner tube (42). The outer tube (40) has a diameter larger than the diameter of the inner tube (42) so that the inner tube (42) is able to slide inside the outer tube (40).

The retaining device has a housing (10) composed of two halves (not numbered) and secured to the outer tube (40), a passage (12), a recessed area (14), a threaded hole (16), a holding arm (20) and a threaded bolt (30). The method to secure the housing (10) to the outer tube (40) is able to apply any suitable means known in the art, such as by bolts or screws. Therefore, detailed description to how the housing (10) is secured to the outer tube (40) is omitted.

The passage (12) is defined in the housing (10) and has a step (120) formed in a mediate portion of the passage (12) so that the passage (12) is divided into two sections, that is, one is for the outer tube (40) and the other one is for the inner tube (42) to be received inside the passage (12). The recessed area (14) is defined in the housing to accommodate the holding arm (20). The threaded bolt (30) is received in a threaded hold (16) defined in the housing (10) and extend out of the housing. The threaded bolt (30) has a knob (300) formed on a distal end of the threaded bolt (30) outside the housing (10).

Figure 3:
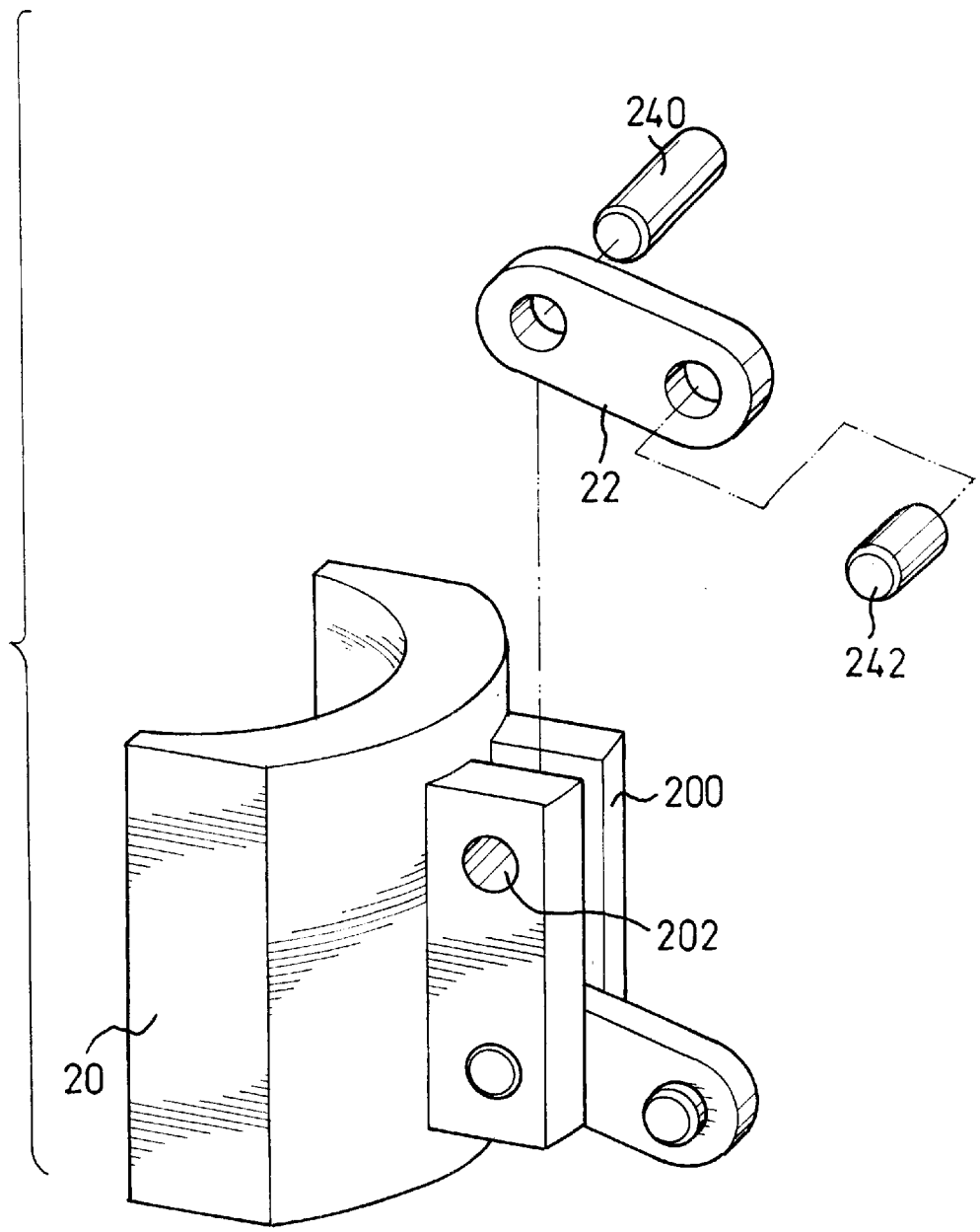
FIG. 3 is an exploded perspective view of the holding arm of the retaining device of the present invention.

With reference to FIG. 3 and still taking FIG. 2 for reference, the holding arm (20) has a pivotal plate (200) integrally formed on a side of the holding arm (20) and at least one ear (22) (two are shown in the embodiment) pivotally connected to the pivotal plate (200) by means of a first pin (240). A second pin (242) is applied to extend through the at least one ear (22) and into an inner face of the housing (10) to allow the at least one ear (22) to be pivotal with respect to the housing (10). Moreover, a spring (26) is provided in the recessed area (14). One end of the spring (26) abuts an inner face of the recessed area (14) and the other end of the spring (26) abuts the pivotal plate (200) to push the pivotal plate (200) together with the holding arm (20) toward the direction where the threaded bolt (30) is located. Thus the pivotal plate (200) always receives a downward force from the spring (26).

A distal end of the threaded bolt (30) is formed with a conical head (302). A distal end of an abutting rod (28) engages with the conical head (302). The rotational movement of the threaded bolt (30) by rotating the knob (300)

triggers the upward or downward movement of the abutting rod (28). The abutting rod (28) is mounted below the holding arm (20) with a gap therebetween. Therefore, when the abutting rod (28) moves, e.g. toward the holding arm (20), and overcome the gap, the holding arm (20) will be lifted upward. On the contrary, when the abutting rod (28) moves away from the holding arm (20), because there is no support to the holding arm (20) the holding arm (20) descends.

Figure 4:
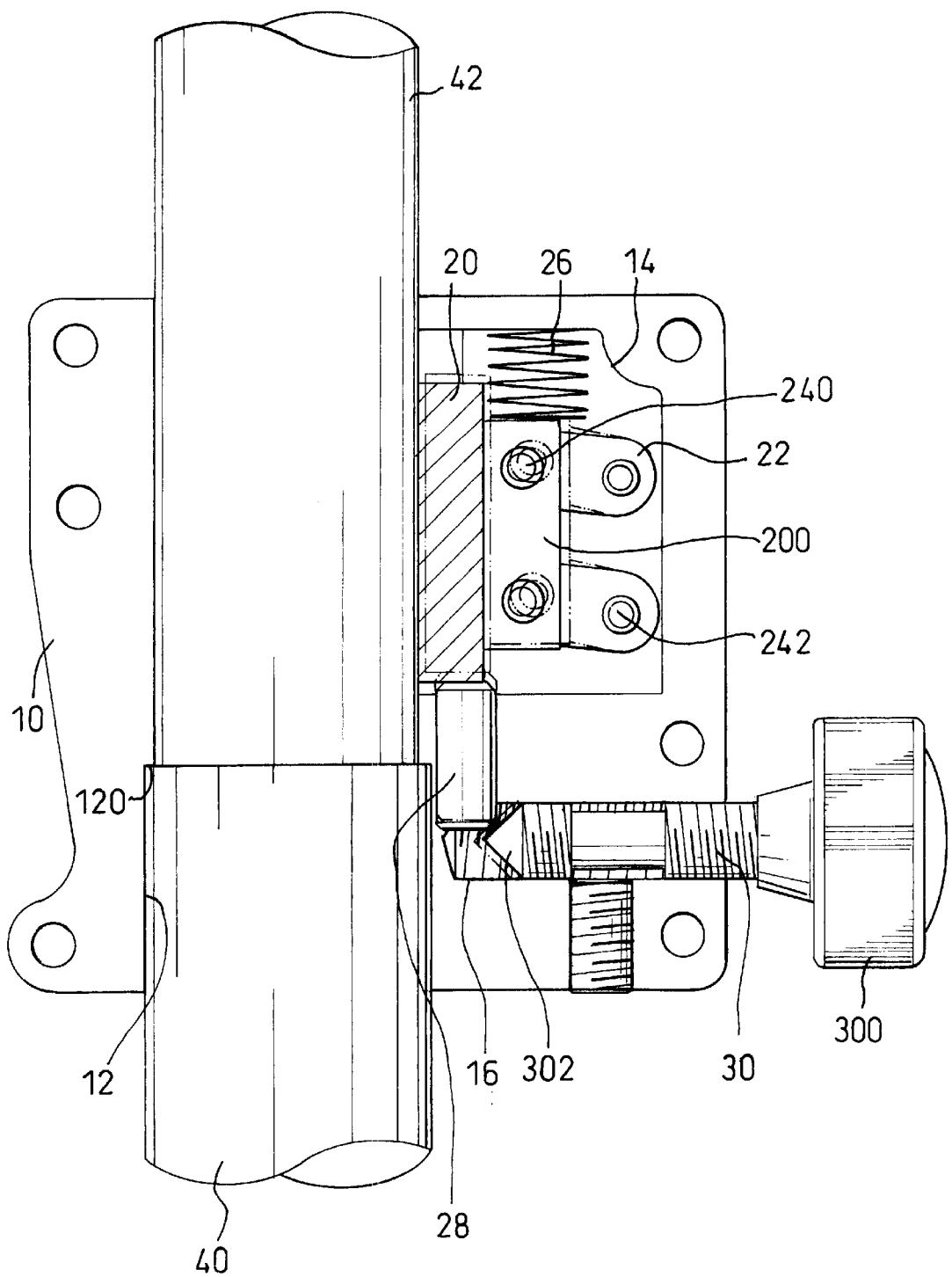
FIG. 4 is an operational view showing the application of the retaining device in combination of the inner tube and the outer tube.

With reference to FIG. 4, after the foregoing movement is described, the retaining device of the present invention is assembled with the inner tube (42) and the outer tube (40). The inner tube (42) is received in the upper portion of the passage (12) and the outer tube (40) is received in the lower portion of the passage (12). An inner face of the holding arm (20) is arcuate to correspond to the curvature of the outer face of the inner tube (42) so that the holding arm (20) is able to abut the outer face of the inner tube (42). Therefore, when the holding arm (20) is pivotally connected to the inner face of the housing (10) by means of the first pin (240) and the second pin (242), the abutment of the holding arm (20) is able to hold the inner tube (42) in place with respect to the outer tube (40). However, when the inner tube is lifted upward relative to the outer tube (40), due to the pivotal engagement of the holding arm (20) to the housing (10), the holding arm (20) is easily pivoted along the upward movement of the inner tube (42). Therefore, the inner tube (42) is easy to extend out of the outer tube (40). When the inner tube (42) is to be retracted into the outer tube (40), the user will have to screw the threaded bolt (30) to lift the abutting rod (28) to allow the pivotal plate (200) to pivot away from the abutting rod (28). Then the holding arm (20) releases the limitation to the inner tube (42) and the inner tube (42) is free to move inside the outer tube (40).

With the arrangement of the retaining device of the present invention, the advantages are:

There is no need to worry about having scratches on the outer periphery of the inner tube even after a long period and continuous usage of the retaining device.

With the pivotal movement of the holding arm and abutment of the holding arm to the inner tube, even the inner tube has a load, the upward adjustment of the inner tube relative to the outer tube can still be supported by the holding arm.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining device for a telescopic music stand having an outer tube and an inner tube slidably received in the outer tube, the retaining device comprising:

a housing adapted to be secured to the outer tube and having a passage with a step so as to adapt to receive the inner tube and outer tube respectively in the passage;

a holding arm pivotally connected to an inner face of the housing and having an inner face configured to mate with an outer periphery of the inner tube; and a spring abutted between the inner face of the housing and the holding arm to force the holding arm toward the passage so that the inner face of the holding arm is able to abut the outer face of the inner tube to hold the inner tube in place relative to the outer tube.

2. The retaining device as claimed in claim 1, wherein the holding arm further has a pivotal plate integrally formed with the holding arm and at least one ear pivotally connected between the pivotal plate and the inner face of the housing to allow the pivotal plate together with the holding arm to pivot.

3. The retaining device as claimed in claim 1 further comprising means for pivoting the holding arm to selectively control the holding arm to engage or disengage with the inner tube.

4. The retaining device as claimed in claim 3, wherein the pivoting means comprising a threaded bolt one end of which is screwed into the housing for engaging with a bottom face of the holding arm and a knob securely engaged with the other end of the threaded bolt to control movement of the threaded bolt.

5. The retaining device as claimed in claim 4 further comprising an abutting rod securely mounted on the bottom face of the holding arm to engage with the threaded bolt.

6. The retaining device as claimed in claim 5, wherein the end of the threaded bolt opposite to the end having the knob has a conical head formed to engage with free end of the abutting rod so that the movement of the threaded bolt is able to control the pivotal movement of the holding arm.

\* \* \* \* \*